United States Patent Office 3,499,151
Patented Mar. 3, 1970

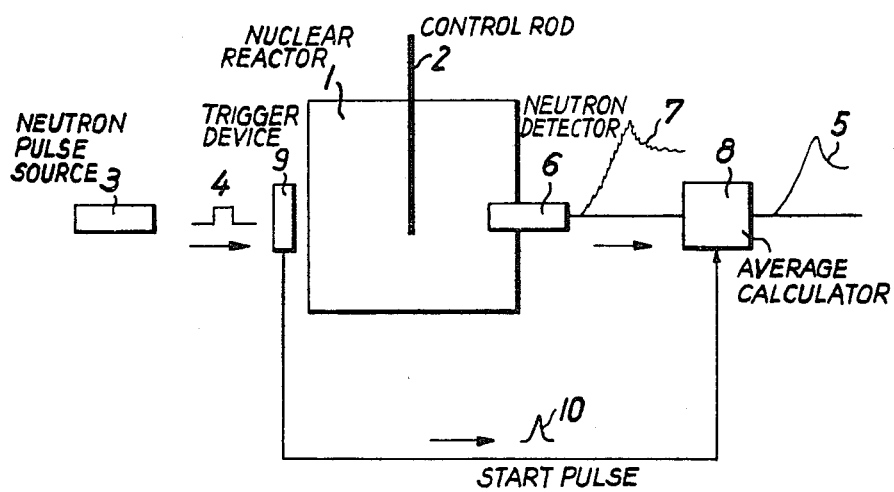

3,499,151
APPARATUS FOR ELIMINATING THE EFFECTS OF NOISE IN THE DETERMINATION OF NEUTRON REACTIVITY
Walter Mayer, Neu Isenburg, Germany, assignor to Licentia Patentverwaltungs G.m.b.H., Frankfurt am Main, Germany
Filed Dec. 19, 1966, Ser. No. 602,958
Claims priority, application Germany, Dec. 18, 1965, L 52,412
Int. Cl. G01t 3/00; H01j 39/32
U.S. Cl. 250—83.1
9 Claims

ABSTRACT OF THE DISCLOSURE

Apparatus for determining the reactivity of a material in an environment having a high noise level by detecting neutrons after they have passed through the material and by processing the detector output in an average calculator which eliminates the noise components from the detector output.

Background of the invention

The present invention relates to the determination of the reactivity of a material with respect to neutrons, and more particularly to apparatus for eliminating the effect of noise on the detection of neutron pulses passing through the material to be tested.

In nuclear reactors, it is often desired to measure a physical constant of the reactor components, such as the reactivity of a control rod for example. In order to accomplish this, it is known to shoot neutron pulses into the reactor from an outside radiation source both when the control rod is inserted and when it is removed. The reactivity of the control rod can then be determined by comparing the shapes of the output pulses from a detector under both conditions.

However, prior art techniques for carrying out this operation, particularly in conjunction with power reactors, have not been able to produce completely satisfactory results because they are not capable of separating the output pulses from the ambient noise to which the detector is subjected.

It has already been suggested to constitute such neutron particle detector by a counting tube which acts as an amplifier. Such a tube is generally of the "avalanche" type and operates in such a manner that each detected particle triggers a current avalanche which produces an indication of the presence of the particle. One drawback associated with this type of tube, however, resides in the fact that it has a significant dead time during the period when each current avalanche is being built up and during which the reception of further particles will not be indicated. As a result, the output will not be proportional to the number of particles captured when particles are received at too high a rate.

If, on the other hand, a particle detector not having such a dead time and producing an output which is substantially proportional to the input is employed, such as an ionization chamber, for example, an amplifier must be connected to the chamber output. However, the amplifier will also act to amplify the noise level to which the detector is subjected so that the amplifier output will not provide an accurate indication of the shape of the received pulse.

It is a primary object of the present invention to eliminate these prior art drawbacks and difficulties.

Another object of the present invention is to provide an accurate indication of the shape of a detected neutron pulse.

A further object of the present invention is to eliminate the noise component from such detected pulses.

Summary of the invention

These and other objects according to the present invention are achieved by the provision, in apparatus for measuring the quantity of elementary particles and including a source of radiation pulses and a particle detector arranged to receive such pulses, of averaging means having an input connected to the output of the detector for producing an output from which random noise variations in the signals appearing at the output of the detector are eliminated.

In apparatus according to the present invention, the radiation pulses produced by the source have a rectangular form and are composed of a neutron beam.

Brief description of the drawings

The single figure of the drawings is a diagrammatic view of a nuclear reactor equipped with a preferred embodiment of the present invention.

Description of the preferred embodiment

The single figure of the drawings shows a nuclear power reactor 1 into which a control rod 2 has been introduced. Neutron pulses 4 having a square waveform are shot into the reactor from a neutron source 3 in a more or less regular sequence. The response of the reactor to the neutron stream is indicated by the distorted output pulse 5 and can be used to determine the reactivity presented by the control rod 2.

After having passed through the reactor, the neutrons are detected by a particle detector 6 which may be constituted by an ionization chamber and which produces a current output proportional to the number of neutrons entering the detector. However, the detector output also contains a substantial noise component, as indicated by the configuration of the waveform 7 representing the detector output, which reduces the accuracy of the indication provided by the detector output.

According to the present invention, the undesired effect of the noise level to which the detector is subjected is eliminated by the provision of an average calculator 8 having its input connected to the output of detector 6 so as to produce the output indicated by the waveform 5. The calculator 8 is designed to analytically average the incoming repetitive pulses so as to eliminate the random noise components from the resulting signal. The output from calculator 8 thus has the desired waveform. Calculator 8 may be constituted, for example, by a device known as the Enhancetron 1024, which is manufactured by the firm Nuclear Data.

The source 3 is arranged, in a known manner, to emit a pulse neutron stream, each pulse of which has a substantially rectangular form, i.e., initiation and termination of each pulse will be relatively abrupt. The output waveform 7 shows the response of detector 6 to one of the received neutron pulses after it has traversed rod 2, while the output 5 from average calculator 8 has a waveform corresponding to the average value of the waveforms of a plurality of such pulses.

It is not absolutely essential for the neutron pulses to be introduced into the reactor at a predetermined rate, because even if the pulses are introduced at spaced time intervals, a measured output can be obtained by feeding the input or the output through a trigger device 9, which will start the average calculator 8 at the beginning of each new primary pulse.

This trigger device may be a neutron indicator, from which one may yield an electrical pulse to start the average calculator 8 when a single neutron stream pulse is emitted by the source 3.

The pulse to start the average calculator may have a form shown in 10.

It should be appreciated that the present invention is not limited to use with power reactors, but it can also be used in other critical installations operating near the critical condition.

The present invention is well suited for testing all of the materials which are used in a nuclear pile. It can be used, for example, to detect the presence of very strong neutron absorbers which might have been inadvertently introduced into the materials, which absorbers can not be detected by chemical means.

It will be understood that the above description of the present invention is susceptible to various modifications, changes, and adaptations, and the same are intended to be comprehended within the meaning and range of equivalents of the appended claims.

I claim:

1. In apparatus for measuring a quantity of elementary particles and including a source of radiation pulses and a particle detector arranged to receive such pulses, the improvement comprising averaging means having an input connected to the output of said detector for averaging the waveforms of repetitive pulses from said detector so as to produce an output signal from which random noise variations in the signals appearing at the output of said detector are eliminated.

2. An arrangement as defined in claim 1 wherein said apparatus is employed in a nuclear reactor.

3. An arrangement as defined in claim 2 wherein said detector is subjected to a high noise level.

4. An arrangement as defined in claim 1 wherein said averaging means are constituted by an average calculator.

5. An arrangement as defined in claim 1 wherein each of said radiation pulses is constituted by a stream of neutrons.

6. An arrangement as defined in claim 1 wherein said particle detector is constituted by an ionization chamber.

7. An arrangement as defined in claim 6 for use in determining a property of reactor materials.

8. An arrangement as defined in claim 7 wherein said apparatus is used for measuring the reactivity of reactor control rods.

9. An arrangement as defined in claim 1 further comprising radiation-responsive trigger means connected to said averaging means and directly responsive to the radiation pulses produced by said source for rendering said averaging means operative each time a radiation pulse is emitted by said source.

References Cited

UNITED STATES PATENTS 3,296,440   1/1967   Schultz et al. _____ 250—83.1

ARCHIE R. BORCHELT, Primary Examiner